(12) United States Patent
Cao et al.

(10) Patent No.: US 11,392,846 B2
(45) Date of Patent: Jul. 19, 2022

(54) LOCAL-ADAPTED MINORITY OVERSAMPLING STRATEGY FOR HIGHLY IMBALANCED HIGHLY NOISY DATASET

(71) Applicants: Canon Information and Imaging Solutions, Inc., Melville, NY (US); Canon U.S.A., Inc., Melville, NY (US)

(72) Inventors: Xiwu Cao, Arcadia, CA (US); Samuel Schrader, Irvine, CA (US)

(73) Assignee: Canon U.S.A., Inc., Melville, NY (US)

( * ) Notice: Subject to any disclaimer, the term of this patent is extended or adjusted under 35 U.S.C. 154(b) by 657 days.

(21) Appl. No.: 16/422,799

(22) Filed: May 24, 2019

(65) Prior Publication Data

US 2020/0372383 A1 Nov. 26, 2020

(51) Int. Cl.
*G06N 7/00* (2006.01)
*G06K 9/62* (2022.01)
*G06F 17/15* (2006.01)
*G06F 17/18* (2006.01)

(52) U.S. Cl.
CPC .............. *G06N 7/00* (2013.01); *G06F 17/15* (2013.01); *G06F 17/18* (2013.01); *G06K 9/6276* (2013.01)

(58) Field of Classification Search
None
See application file for complete search history.

(56) References Cited

U.S. PATENT DOCUMENTS 9,224,104 B2   12/2015   Lin et al.
2013/0097103 A1   4/2013   Chari et al.
2015/0363551 A1*   12/2015   Cezar .................... G16B 40/30
                                                              506/4
2019/0034766 A1*   1/2019   Chen .................... G06N 20/10

OTHER PUBLICATIONS

Chawla, et al., SMOTE: Synthetic Minority Over-sampling Technique, Journal of Artificial Intelligence Research, vol. 16 https://www.cs.cmu.edu/afs/cs/project/jair/pub/volume16/chawla02a-html/chawla2002.html, Jun. 2002, pp. 321-357.
Stefanowski, et al., Selective Pre-processing of Imbalanced Data for Improving Classification Performance, International Conference on Data Warehousing and Knowledge Discovery, Lecture Notes in Computer Science, vol. 5182, pp. 283-292, Sep. 2008, https://link.springer.com/chapter/10.1007/978-3-540-85836-2_27.

* cited by examiner

*Primary Examiner* — Craig C Dorais
(74) *Attorney, Agent, or Firm* — Canon U.S.A., Inc. IP Division

(57) ABSTRACT

Applying a local-adapted minority oversampling strategy technique to an imbalanced dataset including positive samples belonging to a minority class and negative samples belonging to a majority class, the minority class being less prevalent than the majority class, wherein each sample from the dataset includes a plurality of features. The local-adapted minority oversampling strategy includes determining a local imbalance for each positive sample from the minority class corresponding to a number of other positive samples and/or negative samples within a neighborhood of each positive sample. The local-adapted minority oversampling strategy also includes calculating a local-adapted oversampling ratio based on the local imbalance estimated for each positive sample and replicating each positive sample using the local-adapted oversampling ratio to generate a new dataset.

20 Claims, 11 Drawing Sheets

LOCAL-ADAPTED MINORITY OVERSAMPLING STRATEGY FOR HIGHLY IMBALANCED HIGHLY NOISY DATASET

BACKGROUND

Field of the Disclosure

The present disclosure relates in general to a predictive model to determine failed or soon to fail parts on devices that may require servicing, and more particularly, to a local-adapted minority oversampling strategy for highly imbalanced highly noisy dataset.

Description of the Related Art

The classification of imbalanced data is a challenging task in predictive modeling for many industrial applications. A technique that is well known in the art for classifying imbalanced data includes resampling the minority class until the minority class has the same ratio as the majority class, which results in generating newly balanced data. For example, if the minority class includes 100 positive samples and the majority class includes 5000 negative samples, the ratio of positive samples to negative samples is 1:50. Thus, resampling the minority class would increase the minority class to 5000 positive samples so that a 1:1 ratio exists. There are many resampling techniques known in the art, including one-side sampling, cluster-based over-sampling, neighborhood cleaning rule (NCR), synthetic minority over-sampling technique (SMOTE), modified SMOTE, K-means SMOTE and selective preprocessing of imbalanced data (SPIDER).

However, none of the existing approaches is well suited for highly imbalanced highly noisy data where the minority class is often over 50 times less prevalent than the majority class. Resampling is further complicated when the features of the data are highly noisy, meaning that there are many more features for each sample than the samples in the class, particularly in the minority class. It is not always possible to engineer good features due to lack of knowledge about the minority class, not enough samples in the minority class to draw good conclusions and limited resources.

One-side sampling and Neighborhood Cleaning Rule (NCR) both work by under-sampling the majority class. This may cause the new generated dataset to lose its complete representation of the raw information. Cluster-based over sampling over samples the minority class, but only with a coarse resolution across clusters. Cluster-based over sampling cannot differentiate between samples within clusters in the minority class.

Synthetic Minority Over-Sampling Technique (SMOTE) is known in the art for handling imbalanced data. However, SMOTE does not consider the underlying distribution of the minority class. Modified SMOTE corrects the weakness of SMOTE by taking the distances among the samples of the minority class into consideration, but it does not perform well on datasets with highly noisy features because it may create many unintended feature changes. Selective preprocessing of imbalanced data (SPIDER) focuses on improving the sensitivity performance metric, which unfortunately may cause the estimated model to have low precision.

Thus, there is a need in the art for a local-adapted minority oversampling strategy for a highly imbalanced highly noisy dataset.

SUMMARY

The present disclosure is directed to a local-adapted minority oversampling (ALAMO) strategy for highly imbalanced highly noisy datasets as a predictive model to determine a failed or soon to fail part on devices to be serviced. ALAMO strategy may assist technicians in increasing a first call fix rate. The local-adapted minority oversampling strategy in accordance with the present disclosure may effectively manage highly imbalanced highly noisy data, can be applied to any state of the art model to improve that models performance as well as the ability to be implemented without the need to classify every sample into different classes. Some advantages of a local-adapted minority oversampling in accordance with the present disclosure includes oversampling minority samples without manipulating a majority class, determining a replication ratio for each minority sample based on a local imbalance, no requirement for classifying each sample of the minority class into groups and a simple plan for providing a replication ratio for each sample.

The present disclosure is directed to a method of applying a local-adapted minority oversampling strategy to an imbalanced dataset including positive samples belonging to a minority class and negative samples belonging to a majority class, the minority class being less prevalent than the majority class, wherein each sample from the dataset is represented by a plurality of features. The method includes determining a local imbalance for each positive sample from the minority class corresponding to a number of other positive samples and/or negative samples within a neighborhood of each positive sample. The method also includes calculating a local-adapted oversampling ratio based on the local imbalance estimated for each positive sample and replicating each positive sample using the local-adapted oversampling ratio to generate a new dataset.

Further features of the present disclosure will become apparent from the following description of exemplary embodiments with reference to the attached drawings.

DETAILED DESCRIPTION

The following description is of certain illustrative embodiments, although other embodiments may include alternatives, equivalents, and modifications. Additionally, the illustrative embodiments may include several novel features, and a particular feature may not be essential to practice the devices, systems, and methods described herein.

The present disclosure is directed to a local-adapted minority oversampling strategy for highly imbalanced highly noisy datasets as a predictive model for determining failed or soon to fail parts on devices to be serviced. This strategy may assist technicians in increasing a first call fix rate. The local-adapted minority oversampling in accordance with the present disclosure may effectively manage highly imbalanced highly noisy data, can be applied to any state of the art model to improve that models performance as well as the ability to be implemented without the need to classify every sample into different classes. Some advantages of a local-adapted minority oversampling in accordance with the present disclosure includes oversampling minority samples without manipulating a majority class, determining a replication ratio for each minority sample based on a local imbalance, no requirement for classifying each sample of the minority class into groups and a simple plan for providing a replication ratio for each sample.

Highly-Noisy-Feature Data

Figure 1A:
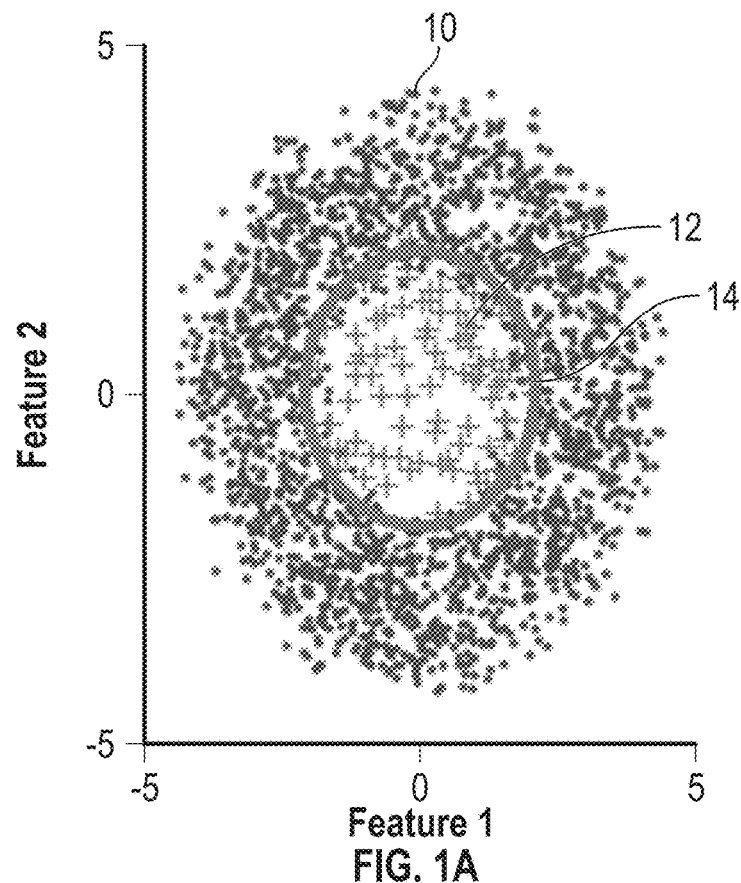
FIG. 1A is a graph of a sample dataset that illustrates good features.

Referring now to FIG. 1A, a graph is shown as an example of a sample dataset with good features. In general, depending on how well the subject that is being observed, the features that are used to define samples in the dataset could be good or bad. The illustration shown in FIG. 1A is exemplary of what good features might look like. FIG. 1A is a graph of a sample dataset with respect to two different features associated with each sample from the sample dataset. The horizontal axis represents Feature 1 and the vertical axis represents Feature 2. The negative samples 10 representing a majority class are indicated by dots and the positive samples 12 taken from a minority class are represented by gray pluses. FIG. 1A shows good features, since a decision boundary 14 is easily determined. The decision boundary 14 is a circle drawn to differentiate between the positive samples 12 and negative samples 10, although there are still a few of each class on the wrong side of the circle decision boundary 14 near the border. A local-adapted minority oversampling strategy or technique is not recommended for a dataset with a clearly defined decision boundary 14 separating most of the positive samples 12 from the negative samples 10.

Figure 1B:
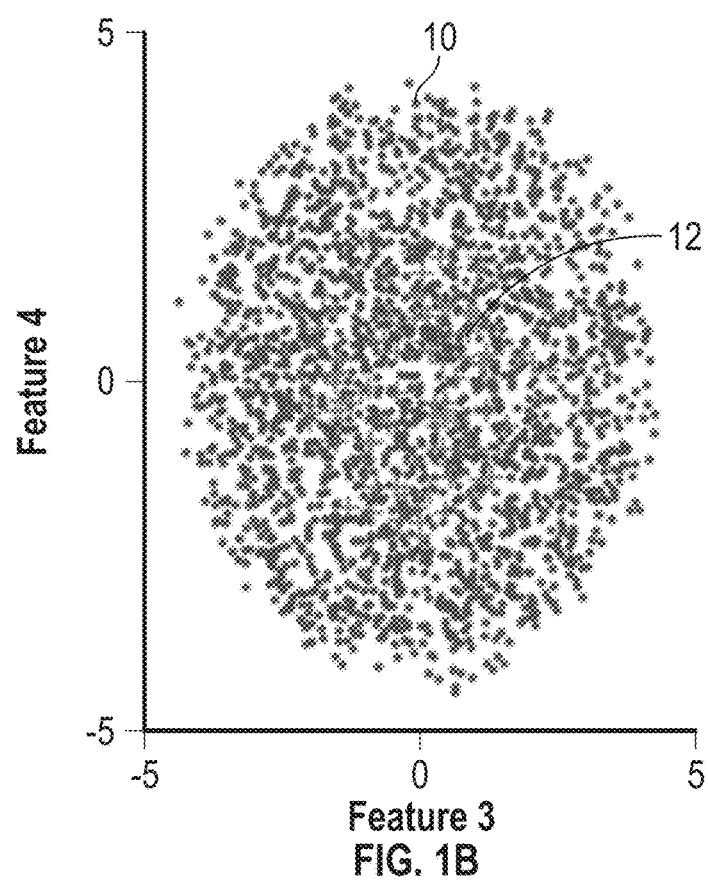
FIG. 1B is a graph of a sample dataset that illustrates bad features.

The local-adapted minority oversampling strategy or technique of the present disclosure is better suited for a dataset without a clearly defined decision boundary as shown in FIG. 1B. FIG. 1B is an example of a sample dataset with bad features where the data samples are represented with respect to feature 3 and feature 4. The illustration shown in FIG. 1B is a visual indication of what bad features may look like in an exemplary dataset. FIG. 1B shows bad features, since a boundary to split the data into the positive samples 12 and negative samples 10 is not easily determined. The two datasets representing both the positive samples 12 and the negative samples 10 sit on top of each other and no matter what is tried, a group of positive samples 12 from a minority class cannot be determined without introducing a large number of negative samples 10 from a majority class.

Although good features are desired in classification and predictive modeling, they require a thorough understanding of what makes the positive samples different from negative samples. Good subject matter feature engineering often requires years of experience in a particular subject. In reality, both good and bad features are used due to both the lack of time and resources, as well as limited knowledge of the subject matter. It is difficult to determine which features are good or bad. The solution can be a combination of all the features available from the dataset. Using all the features from the dataset may mean leveraging thousands of features together, some of the features might be useless, to obtain the final predictive performance of the predictive model. This may be challenging when the number of features significantly outnumber the number of positive samples. A highly noisy feature dataset occurs when the number of features significantly outnumber the number of positive samples.

Figure 2:
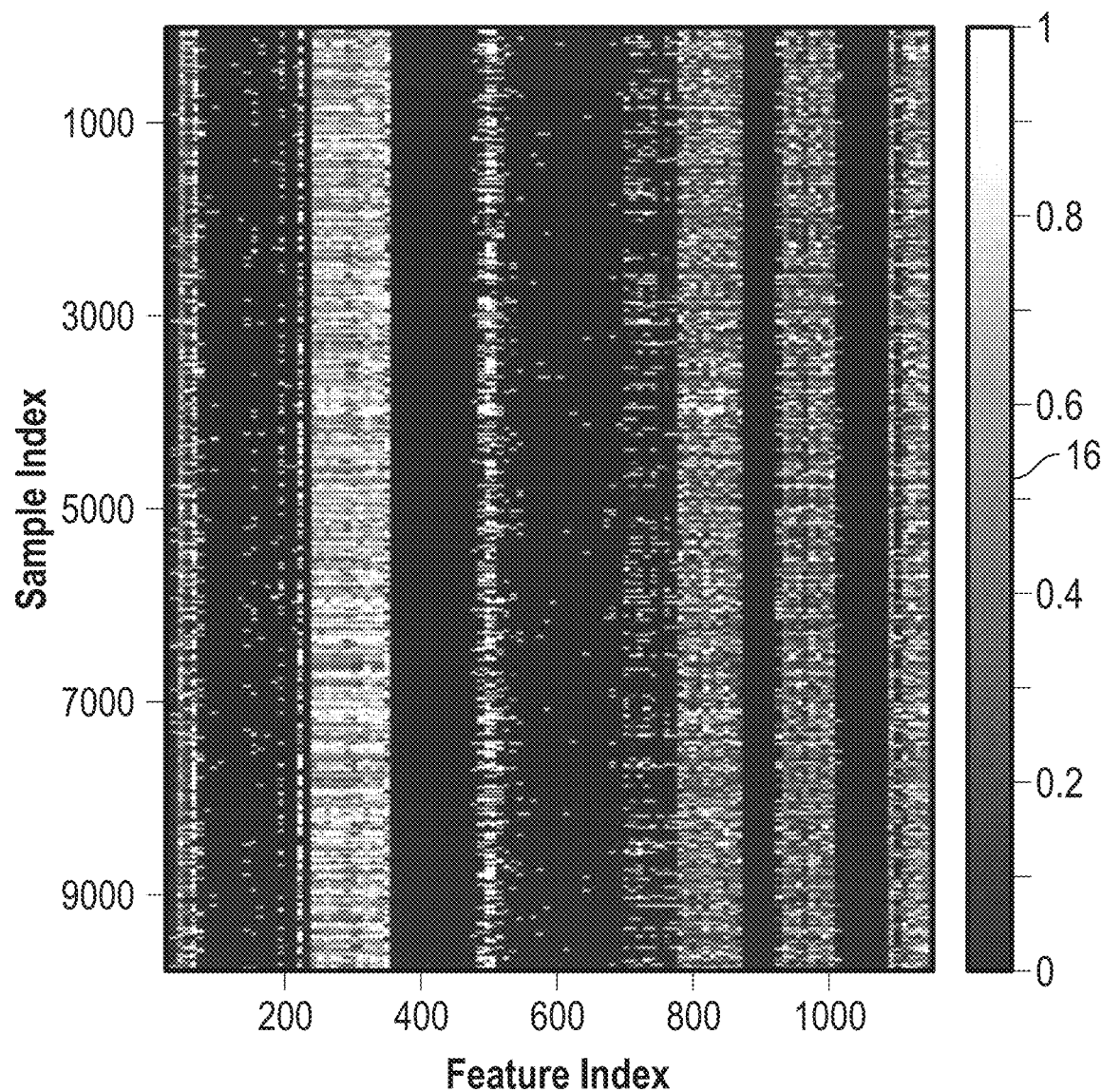
FIG. 2 is a graph illustrating a sample dataset with highly-noisy features.

FIG. 2 is an example of a dataset with highly noisy features. The dataset from the FIG. 2 example is a real dataset collected from printers, predicting the failure of a printed circuit board assembly (PCB-ASSY). The dataset from FIG. 2 is used throughout the present disclosure as an exemplary dataset to illustrate the effective application of a local-adapted minority oversampling strategy to a highly imbalanced highly noisy dataset with real-world application. The local-adapted minority oversampling strategy in accordance with the present disclosure is applicable to datasets collected from various devices with many different real-world applications.

It is difficult to apply general knowledge to forecast when the PCB-ASSY needs replacing. One approach is to collect as many potentially meaningful features as possible and hope that some good features are also contained in the collection. This results in a highly noisy feature dataset. The number of positive samples in this example is only 188, but each sample has 1155 features as illustrated by the horizontal axis of FIG. 2. The vertical axis is indicative of the total number of samples associated with the dataset. The 1155 features are pre-selected from a pool of 6898 raw features based on some known preprocessing criteria. The goal is to determine whether the PCB-ASSY should be replaced based on the 1155 features. The bar 16 to the right of the graph indicates the magnitude of each feature after being normalized across the entire population. Note that it would be difficult to visualize all features in one graph without normalization since some features can cover a range of magnitude of more than five orders while others only range from 0 to 1.

The issue with highly noisy feature data is that the coverage of the positive samples from the minority class and the coverage of the negative samples from the majority class may overlap, which makes it difficult to design an effective distance metric or draw a clear boundary between the positive samples and negative samples.

Principal component analysis is one eigenvalue method used to reduce a high-dimensional dataset into fewer dimensions while retaining important information. It is a classical linear dimensionality reduction method that attempts to find linear combinations of features in the original high dimensional data matrix to construct meaningful representation of the dataset. After the dataset is normalized, the top four principle components using singular value decomposition (SVD), i.e., principal components pca 1, pca 2, pca 3 and pca 4, are estimated and taken to re-project all the samples in the dataset and shown in FIG. 3. The positive samples 19 are marked with white stars and the negative samples 21 are marked with gray dots.

Figure 3:
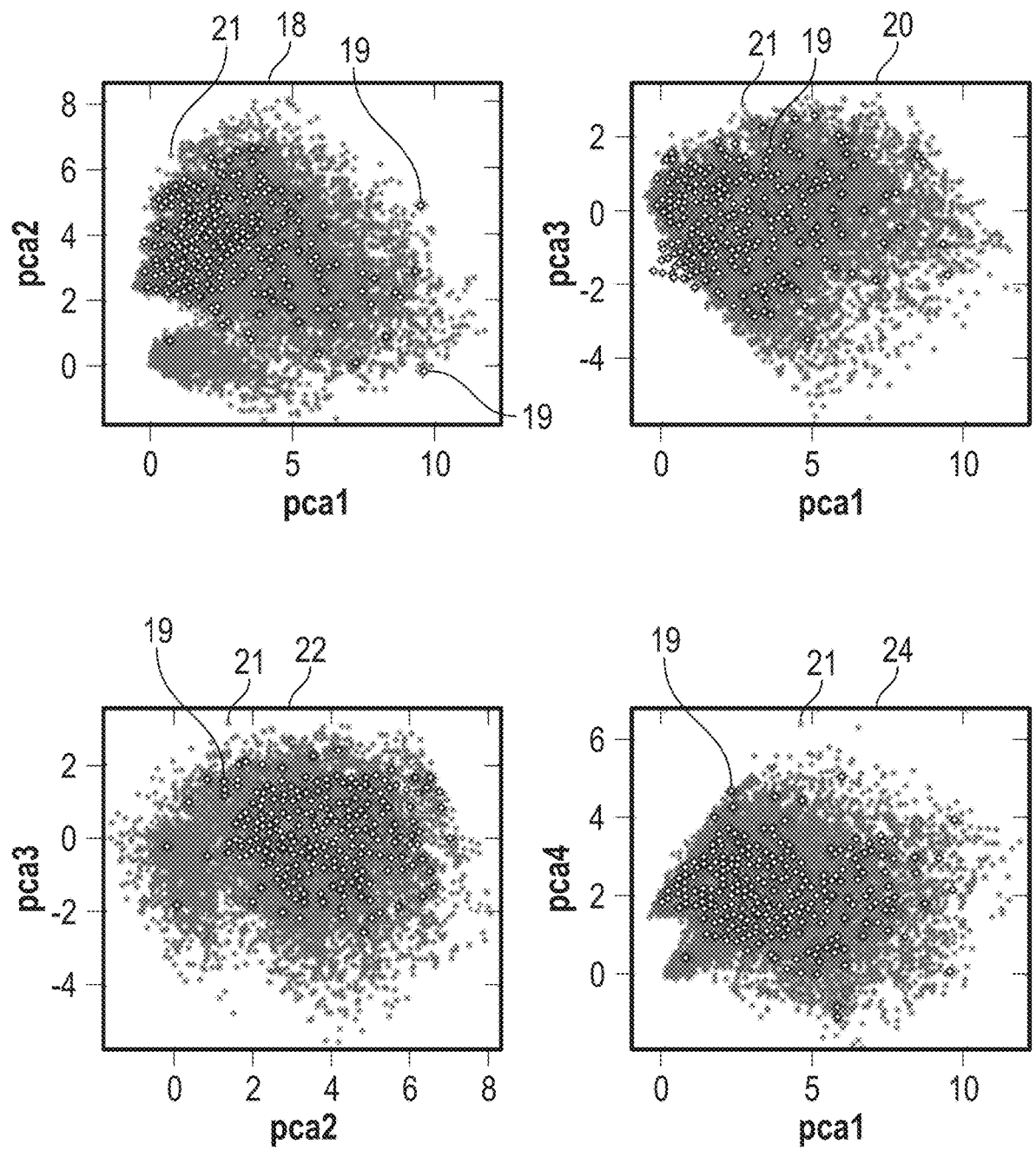
FIG. 3 illustrates four candidate projection plots.

FIG. 3 illustrates how the positive 19 and negative 21 samples may overlap from all four-candidate projection plots, including pca 1-pca 2 (18), pca 1-pca 3 (20), pca 2-pca 3 (22), pca 1-pca 4 (24), making prediction difficult. This overlap prevents simply classifying each sample of the minority class into groups of different risks, such as: safe, borderline, or noisy, which is what most established approaches attempt to do. The established approaches will classify the entire minority class as noisy, which is not helpful. The option of first classifying each sample and then oversampling according to its risk group is not helpful either. Instead, a local-adapted minority oversampling approach determines a local-adapted oversampling ratio for each positive sample and each positive sample is replicated based on the local-adapted oversampling ratio accordingly. This strategy relies on the distances of positive samples to all other positive and negative samples.

Highly Imbalanced Data.

Imbalanced data is very common. For example, the admission rates for Ivy League colleges range from 5% to 15%, an imbalance ratio of about 1 acceptance to 9 rejections. Other examples include the risk of credit card fraud per year (2%), the percentage of population infected with HIV (0.3%), and the defect rate for factory production components (~0.1%).

Generally, imbalanced data is split into two groups: a majority class and a minority class. The ratio between the minority and majority classes is often around 1 over 2. For highly imbalanced data, this ratio could be less than 1 over 50, or even 1 over 100. For example, the dataset used for predicting CPU-PCB_ASSY replacements from the example above is a ratio of about 1.9%, which implies an imbalanced ratio of 1 over 51.5638 between the minority class and the majority class.

The classification of imbalanced data is quite challenging since the imbalance of the dataset will make many performance metrics lose their capability of accurately evaluating the performance of the model. For example, given one over ten as the imbalance ratio of minority class to majority class, we can achieve an accuracy of 90% even if we just label each sample as the majority class. Thus, it is preferred to generate a much less imbalanced dataset from the extremely imbalanced dataset we have.

Figure 4:
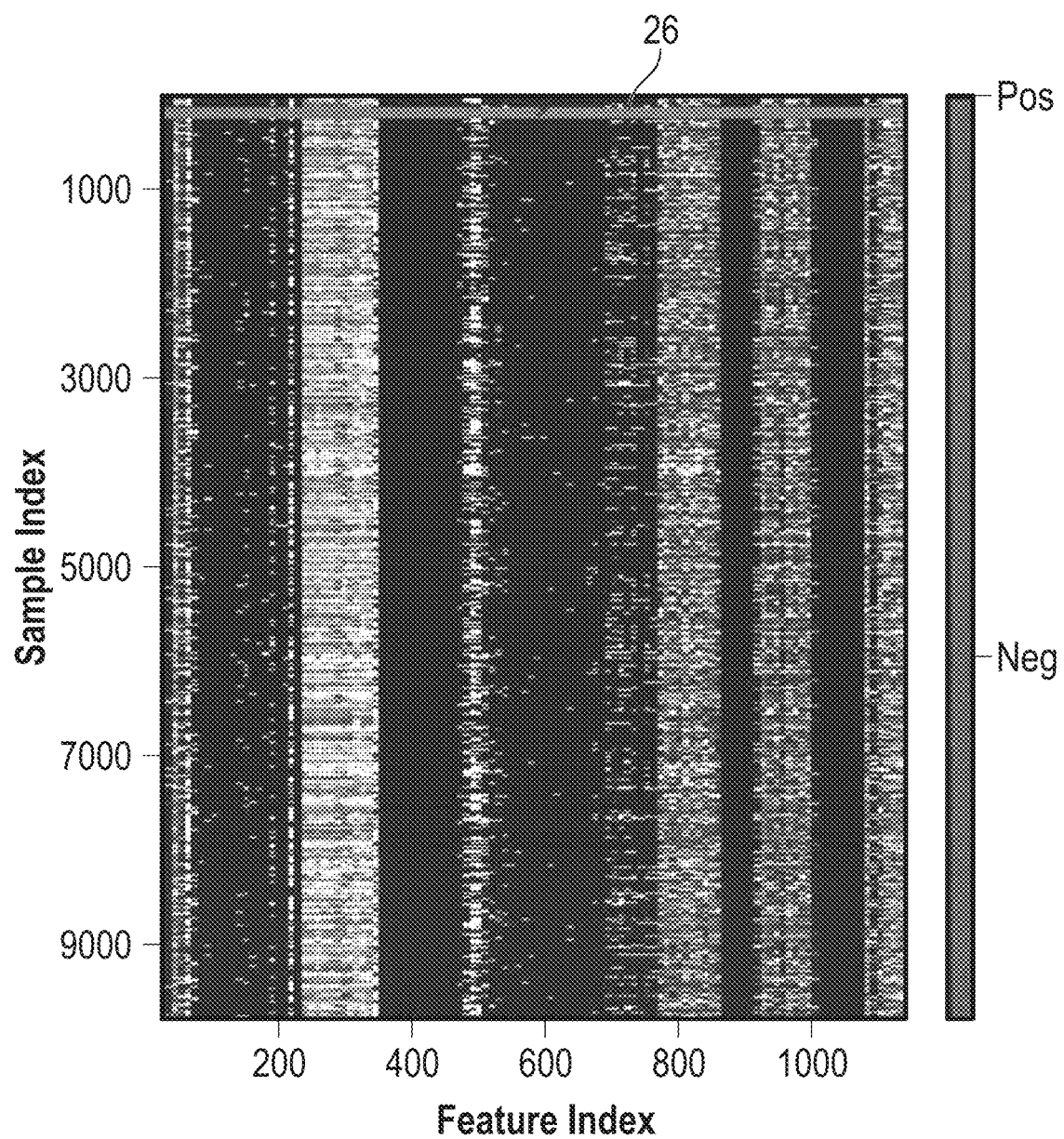
FIG. 4 is a graph illustrating a highly imbalanced dataset.

The present disclosure focuses on binary class classification, although a local-adapted minority oversampling approach proposed in the present disclosure may be used for multi-label and multi-class classification. FIG. 4 shows the same example dataset from FIG. 2, but rearranges the data into two sections divided by a line 26. The section above the line 26 includes the positive samples from the minority class and the section below the line 26 includes the negative samples from the majority class. In this particular example, there are 9,882 total samples, 188 positive samples, and each sample contains 1155 features.

Figure 5:
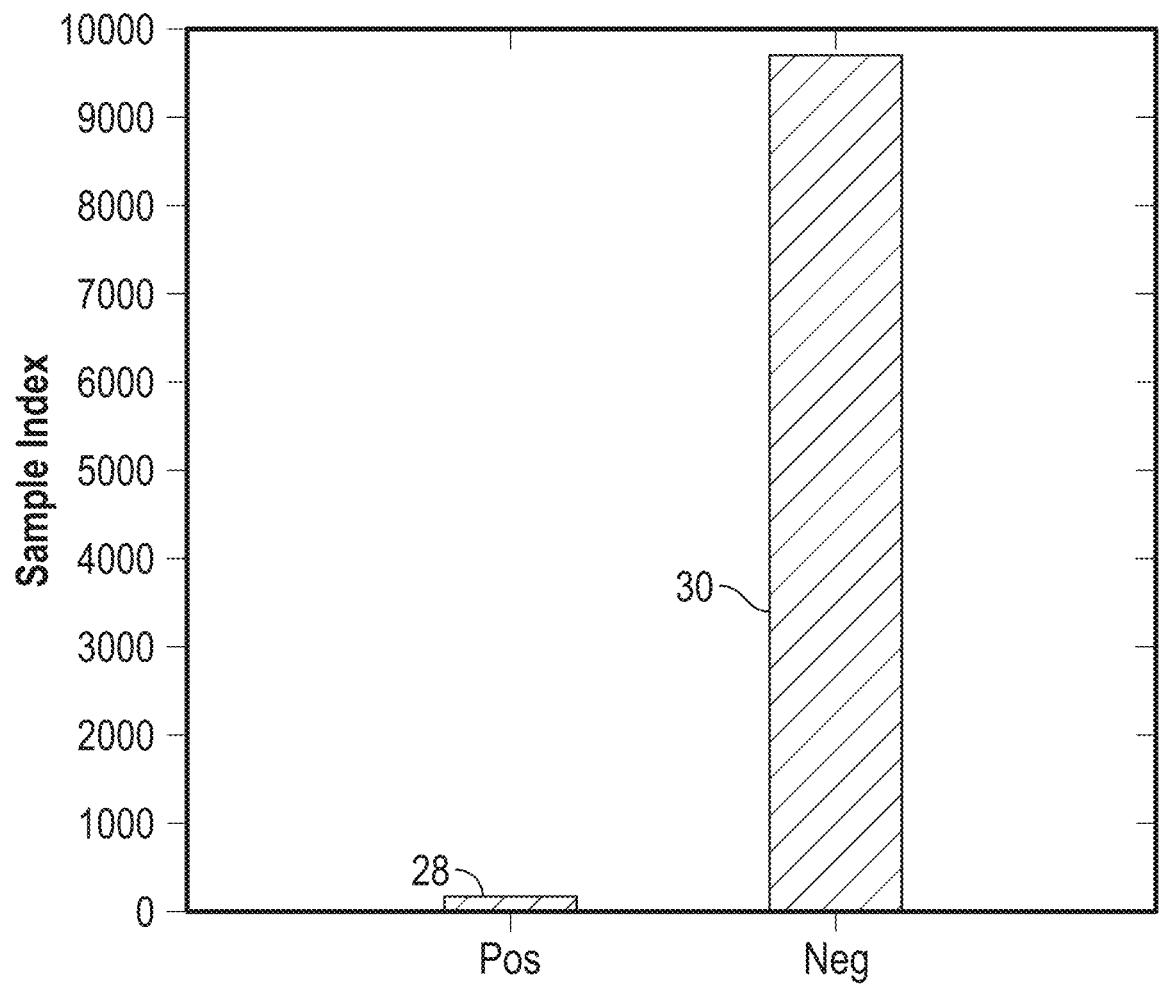
FIG. 5 is a bar graph as an example of a highly imbalanced dataset.
Figure 6A:
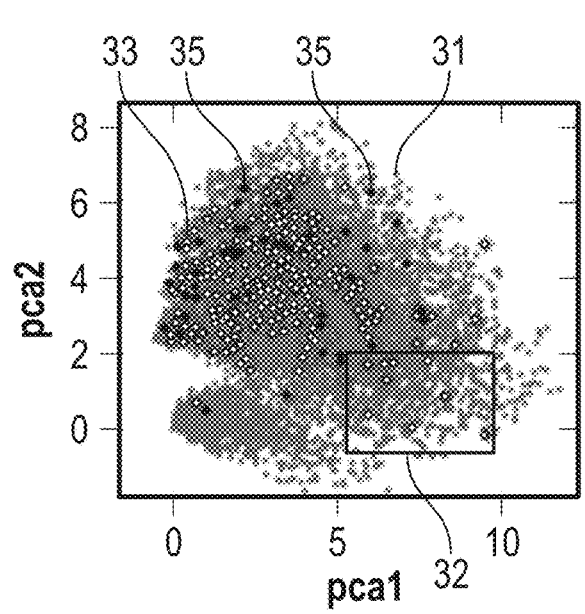
FIGS. 6A to 6D are graphs illustrating different coverage between a training dataset and a testing dataset for a minority class.
Figure 6B:
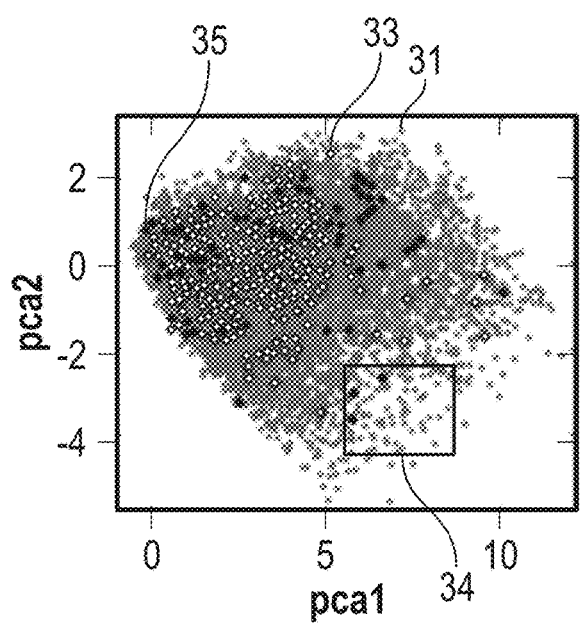
Figure 6C:
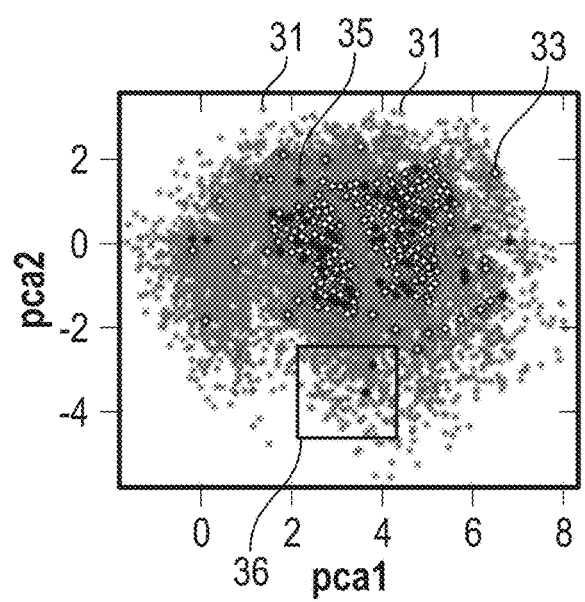
Figure 6D:
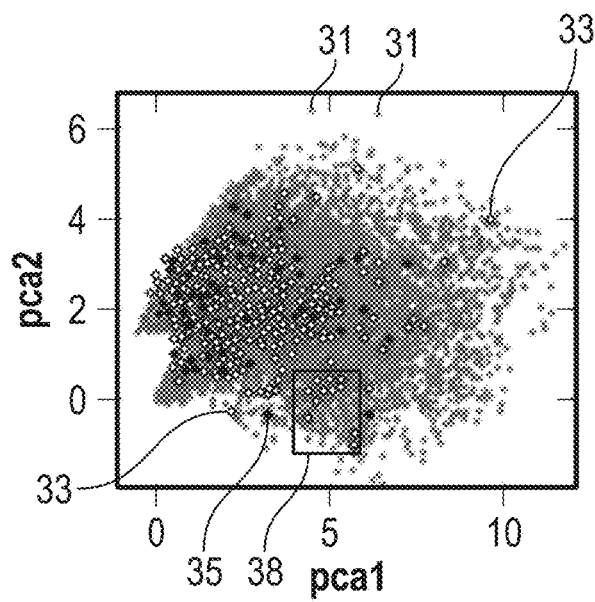

It is not difficult to tell that the data is highly imbalanced and the ratio of the positives to the negatives is 1 over 51.5638. This imbalance is easily visualized from the bar plot shown in FIG. 5. The bar representing positive samples 28 of the minority class reflects 188 positive samples out of the total 9,882 samples. The bar representing negative samples 30 of the minority class reflects 9,694 negative samples of the majority class.

In general, despite whether the dataset is balanced or imbalanced, it is assumed that the distribution in a training dataset should be similar to the distribution of samples in the testing dataset. This similarity should hold for both positive samples and negative samples. This assumption is reasonable if the number of features used for representing each sample is much smaller than the number of samples available in the dataset, since each feature can be sampled multiple times to give a good approximation of its real distribution.

This assumption is not true for the minority class in a highly imbalanced highly noisy feature dataset, where the number of positive samples is much smaller than the number of features, thus making it almost impossible to sample all the space in the minority class.

For the minority class, the sample set is only a sparse representation of the whole minority space. The training distribution does not comprehensively represent the testing distribution. For example, given 1155 features used for representation, 188 positive instances can only sparsely sample the space of the minority class, giving less than one sample per six features. In order to comprehensively sample the minority space, sampling multiple times for each possible value on each feature is required, which is not available in highly imbalanced highly noisy feature datasets.

FIGS. 6A-6D show the data processed with the sample approach described above with respect to FIG. 3 with the addition of a test dataset (black stars 35). The samples in the training dataset for the minority class cover different areas in the projected sample space than the samples in the testing dataset.

As shown in FIGS. 6A-6D, the white stars 33 mark the samples of the minority class from the training dataset, and the black stars 35 mark the samples of the minority class from the testing dataset. In the projection plot for FIG. 6A, the rectangle 32 represents an area that only contains samples of the minority class from the training dataset. In the projection plot for FIG. 6B, the rectangle 34 represents an area that only contains samples of the minority class from the testing dataset. In the projection plot for FIG. 6C, the rectangle 36 represents an area that only contains samples of the minority class from the testing dataset. In the projection plot for FIG. 6D, the rectangle 38 represents an area that only contains samples of the minority class from the training dataset. These coverage differences shown in FIGS. 6A-6D do not provide much benefit from saving the hard cases of minority class in the training set. Thus replicating those samples found in the areas that only contain samples of the minority class from the training dataset is not recommended.

Approach for Highly Imbalanced Highly Noisy Data

Recall and precision are metrics derived from four basic numbers, i.e., true positive (TP), true negative (TN), false positive (FP) and false negative (FN) in binary classification, as shown in Equation 1 and Equation 2. TP, TN, FP and FN are well known from the concept of confusion matrix.

$$\text{Recall} = \frac{TP}{TP + FN} \quad \text{(Equation 1)}$$

$$\text{Precision} = \frac{TP}{TP + FP}. \quad \text{(Equation 2)}$$

It is recommended that the Recall and Precision parameters be balanced in estimating a prediction model using a local-adapted minority oversampling strategy in accordance with the present disclosure. The Recall parameter is important, since it represents how good the prediction model is in capturing the positive minority; however increasing the recall parameter requires sacrificing the Precision parameter in exchange for a little better Recall.

MCC stands for Matthew's correlation coefficient, which is a metric often used in the evaluation of candidate models. It combines both Recall and Precision and represents good performance in model performance evaluation for imbalanced datasets, particularly for extremely highly imbalanced datasets. Its definition in mathematics is shown as Equation 3.

$$MCC = \frac{TP \times TN - F \times FN}{\sqrt{(TP+FP)(TP+FN)(TN+F)(TN+FN)}}. \quad \text{(Equation 3)}$$

MCC is used here as the metric for model performance evaluation for both the training dataset and testing dataset, although some other metrics including AUC (Area under ROC curve) or F1 score could also be good candidates in finding the optimal model. The use of MCC in the present disclosure is merely by way of example and not meant to limit in anyway different metrics for model performance evaluation.

Oversampling of the minority class is a good technique to handle imbalanced data. Most of the time, we can simply work on the difficult cases in the samples for the minority class. The difficult cases can simply mean the borderline cases, which are located within, or near the borderline, that divides the positive and negative samples. As a solution, many approaches replicate only difficult cases, causing the model to have better Recall (it notices the outliers) without losing considerable Precision.

This oversampling of difficult cases located near the border approach works well if there are well-engineered features for the minority class and the imbalance between the minority and majority is not too large. For the highly imbalanced highly noisy feature dataset, this may be problematic, because there will be almost no safe samples available from the minority class in the dataset. In other words, all the samples from the minority class may be classified incorrectly into the majority class if we use some simple distance metric, for example, k-nearest neighbors algorithm (K-NN). In pattern recognition, the K-NN is a non-parametric method used for classification and regression. In both cases, the input consists of the k closest training examples in the feature space. K-NN is a type of instance-based learning, where the function is only approximated locally and all computation is deferred until classification.

Given the sparse representation of samples from the minority class in a highly imbalanced dataset, an oversampling strategy should be applied appropriately to each sample.

In general, highly imbalanced and highly noisy feature datasets only provide a sparse representation of the whole minority data space. This sparsity also implies how the minority space is sampled is very important. Each sample may provide a sizable impact on performance depending on how it is sampled. A fixed oversampling ratio for all samples should not be used.

The present disclosure uses a local-adapted oversampling strategy for each sample of the minority class, where each sample is replicated at a different ratio. The replication ratio of each sample is determined based on its distance from all the other negative and positive samples, as well as the global imbalance ratio.

Although balancing the minority samples using the global dataset imbalance does not produce the best results, it can serve as a good starting point to search for the best global replication ratio.

Unlike many approaches that boost the hard cases of the minority class to obtain higher Recall, the present disclosure boosts the easy cases and downplays the hard cases to achieve higher Precision. The reason is that the inclusion of those hard cases will not help significantly in improving Recall because of the sparse representation of the imbalanced highly noisy feature dataset. When the hard cases are increased, it will help slightly with Recall but cause the Precision to reduce significantly.

For example, if a positive sample is tightly enclosed by 10 negative samples, saving that positive sample will result in having 10 false positive coming from the 10 negative samples. In that situation, a better solution might be to remove the hard positive to avoid all of the false positives.

However, in one embodiment of the present disclosure a zero replication ratio is used, which means no additional replication for that positive sample, to reduce the impact of that sample and also account for the possible wrong selection of a distance metric.

Figure 7:
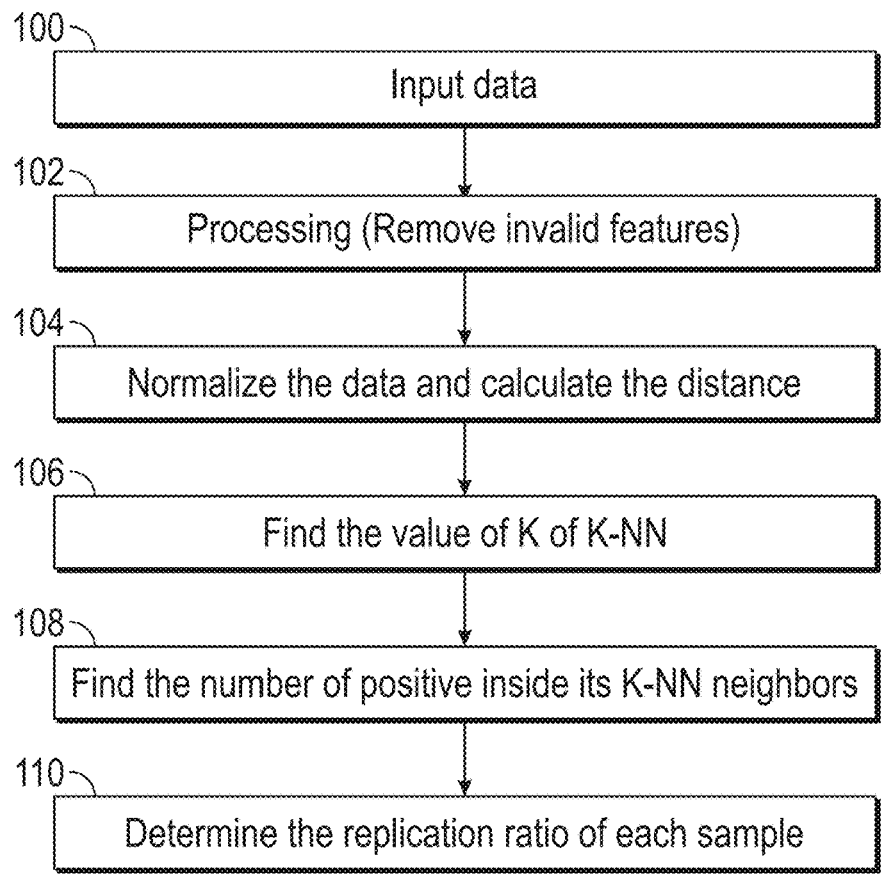
FIG. 7 is a flowchart illustrating various steps associated with a local-adapted minority oversampling strategy in accordance with one or more aspects of the present disclosure.

FIG. 7 is a flowchart illustrating the steps for a local-adapted minority oversampling strategy in accordance with the present disclosure. The flowchart includes six steps. The first step may include inputting data 100, which includes the total samples of the majority, and minority classes including all the features associated with each of the samples. The next step is a processing step 102 which involves the preprocessing of raw features from the sample dataset to remove invalid features for later processing. The third step is a normalizing step 104 which may include normalizing each feature column and calculating the distances between the samples. The next step may involve determining the value of K in K-NN (K nearest neighbors), and then the step of finding the number of positive samples 108 from the K nearest neighbors for each positive sample in the minority class. Finally, the local-adapted minority oversampling technique may conclude with determining a replication ratio 110. The replication ratio is based on the number of positive samples in the neighborhood of each positive sample, each positive sample is additionally replicated according to its replication ratio, and a newly balanced dataset is generated for model training.

Before resampling the positive samples, there needs to be an initial feature selection to remove invalid features from the data samples. This preprocessing step 102 may include removing feature columns with too many missing values or removing feature columns that do not have any variation.

It may also be necessary to combine features, which are from different domains. For example, numerical and textural feature columns may need to be combined. The dataset in the example described above and throughout the present disclosure contains both numerical and textural data. The numerical data is made of both categorical and continuous numbers. The textual data are documents recorded from dispatchers handling customer calls before technicians are sent to visit. To use the textual data, the textual data is first converted into a sparse matrix based on the occurrence frequency of each word in the corpus and then projected and vectorized into 80-dimensional vectors based on their Singular Vector Decomposition (SVD). Finally, both the numerical and textural data are combined to form a new sample space. For example, after the numerical and textural data are combined, a new dataset where each instance is represented by 1235 features (1155+80).

One of the oversampling strategies is to use the global imbalance ratio and apply the same replication number to each minority sample. This approach is known as fixed global oversampling. For example, given a total of 9882 samples and 188 minority samples, results in a global imbalance ratio of around 52, each minority sample would then be replicated 52 times.

This is a good assumption if the minority samples are evenly distributed in the space. However, as demonstrated above, this assumption is invalid since the samples obtained from the minority class is just a sparse representation of data space. Thus, the global imbalance ratio as the value we use for replication is not effective and should not be used. Instead, the present disclosure searches for the best global oversampling ratio based on the performance evaluation of the model, since there is no way to tell what the distribution of the data should be. This actually also serves as a starting point for a local-adapted minority oversampling approach in accordance with the present disclosure.

Figure 8:
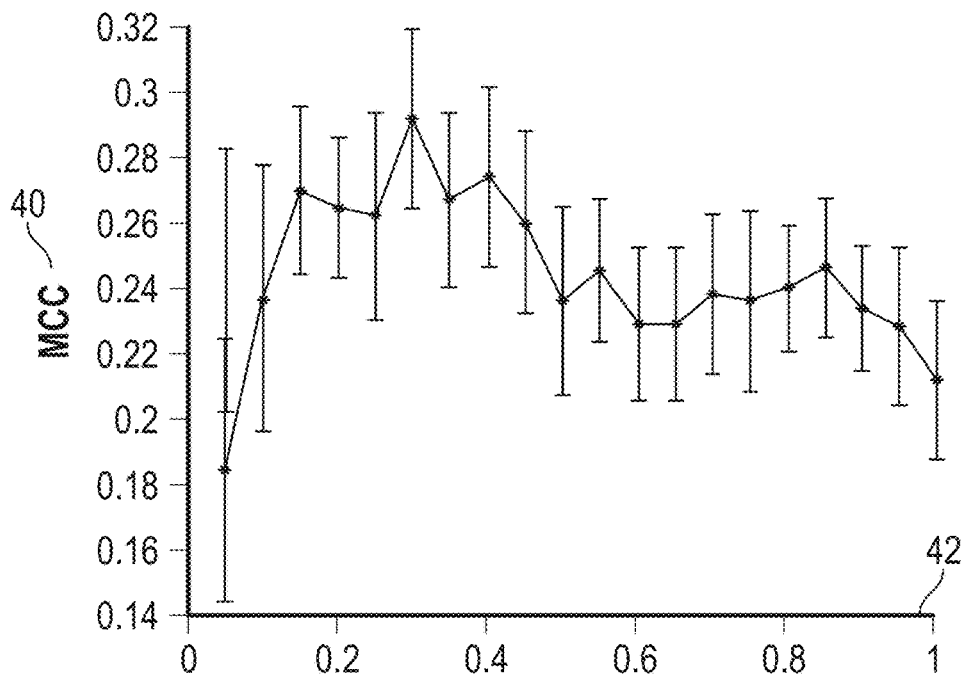
FIG. 8 is a graph illustrating performance results in accordance with one or more aspects of the present disclosure.

FIG. 8 is a graph representing different MCC 40 values for different values of an oversampling index 42 ranging from a value greater than 0 to a value of 1. Here, the oversampling index of 1 represents simply replicating each minority sample using the global imbalance ratio, or in other words, replicating the minority sample 52 times. If the oversampling index is varied from 0.1 to 1 with increments of 0.05, it is possible to find what the best global replication ratio should be based on the model evaluation (MCC 40). As shown in FIG. 8, the best performance occurs when the oversampling index is equal to a number around 0.2 to 0.3, which means an average replication ratio of 10 (0.2×52≈10), instead of 52, should be applied to the minority samples. In other words, the average replication ratio is calculated by multiplying the global imbalance ratio (52) by the oversampling index that results in the best performance, which in this example is 0.2, resulting in an average replication ratio of around 10.

MCC from equation 3 is used as the metric to evaluate the performance of the model. However, other metrics may be used in accordance with the present disclosure. MCC is merely one metric used to evaluate the performance of the model, other metrics may be used to evaluate the performance of the model in accordance with the present disclosure.

A local-adapted minority oversampling strategy requires calculating the distance between samples, including the distance between the samples across classes (between the positive minority class and the negative majority class), and the distances of the samples within the same class.

Many metrics are available to allow for calculating the distances, including Euclidean, L1, L2, Manhattan, correlation, Kulsinski, Minkowski, as well as many others. Without loss of generality, the Minkowski metric is used in the present disclosure as the metric to calculate the distances between samples given its convenience as the default distance metric in Scikit-learn package. However, the use of Minkowski is merely by way of example and not of limitation. Other metrics may be used in accordance with the present disclosure to calculate the distances between the samples.

In mathematics, the Minkowski distance between any two points X and Y, where $X=(x_1, x_2, \ldots, x_n)$ and $Y=(y_1, y_2, \ldots, y_n) \in R^n$ can be defined as $$D(X,Y) = (\Sigma_{i=1}^{n} |x_i - y_i|^p)^{1/p}$$ (Equation 4)

When p is equal to 2, it is the same as the Euclidean distance.

Figure 9:
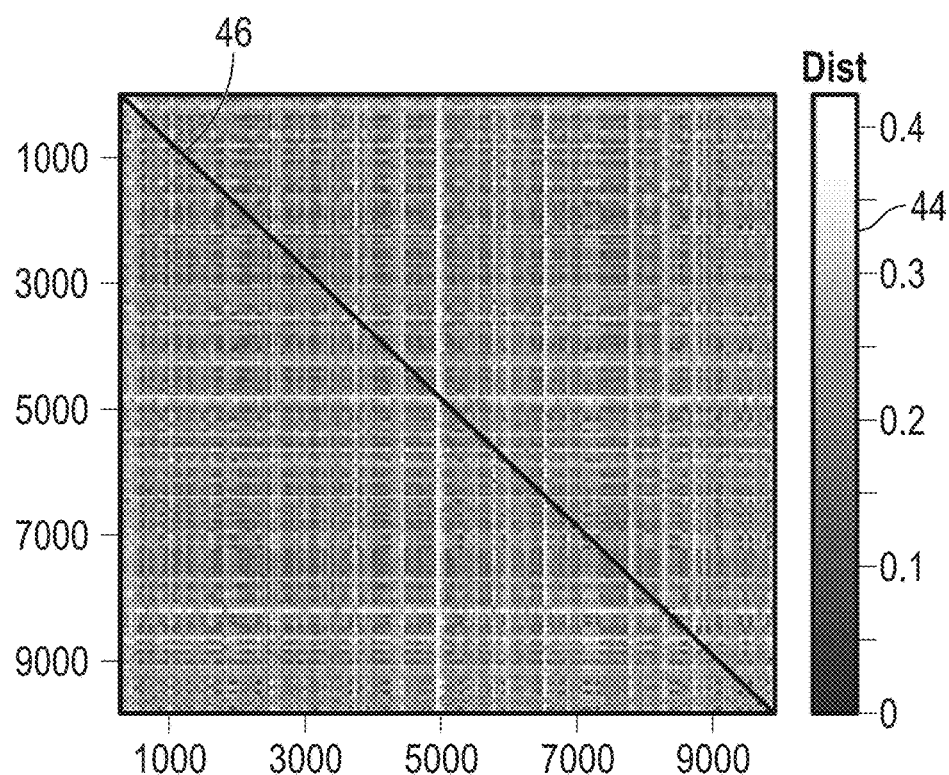
FIG. 9 is a graph illustrating distances between any two samples in the dataset.

Once the distance metric is defined, the distances between the samples in the dataset may be calculated. The result is shown in FIG. 9. Here, the mutual distance between any two samples is calculated in the whole training set, thus having a distance matrix of 9882 by 9882. The graph in FIG. 9 includes a dark line 46 along the diagonal, which represents the distance between any sample and itself is zero. The bar 44 next to the graph indicates the range of distances between any two samples.

Figure 10:
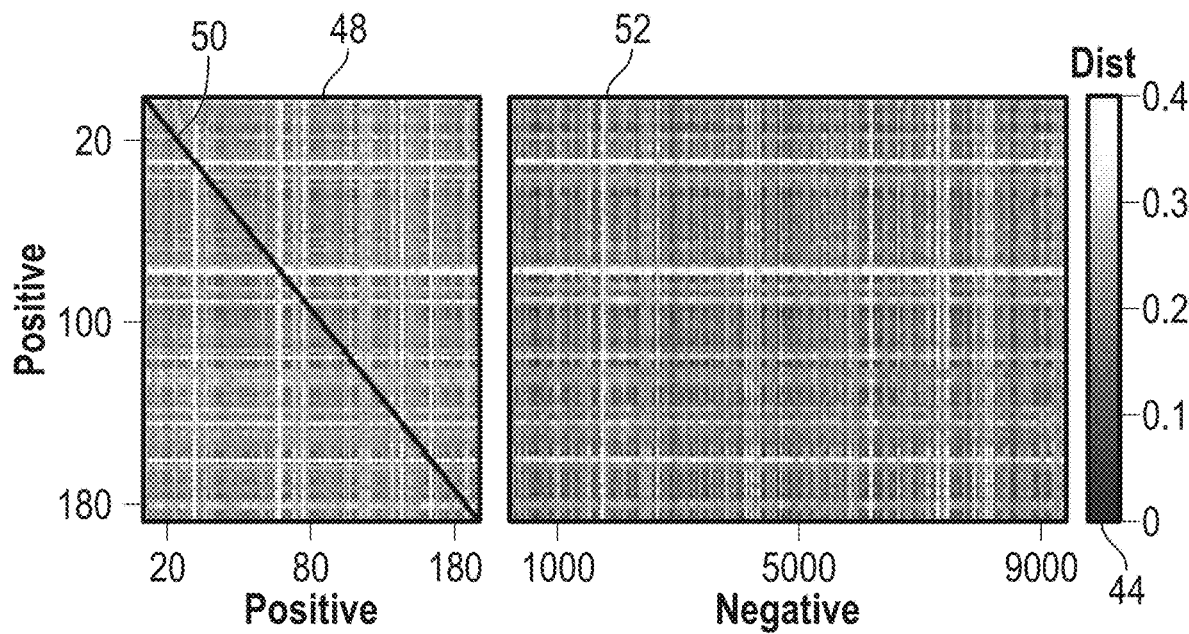
FIG. 10 is a graph illustrating distances between positive samples and all other samples from the dataset.

In reality, there is no need to calculate the distances between any two samples, but only the distances between any minority sample and all other samples. Thus, the distance matrix shown in FIG. 10 is much smaller compared to the distance matrix of FIG. 9. FIG. 10 shows two graphs, one graph 48 including the distances among 188 positive samples and another graph 52 including the distances between 188 positive samples and 9694 negative samples.

Similar to FIG. 9, a dark line 50 along the diagonal of the graph 48 from the distances between positive samples is also observed.

Knowing the distances between each positive sample from the minority class and all other positive and negative samples from both the majority and minority class, the number of other positive samples within the neighborhood of each positive sample are obtainable.

Figure 11:
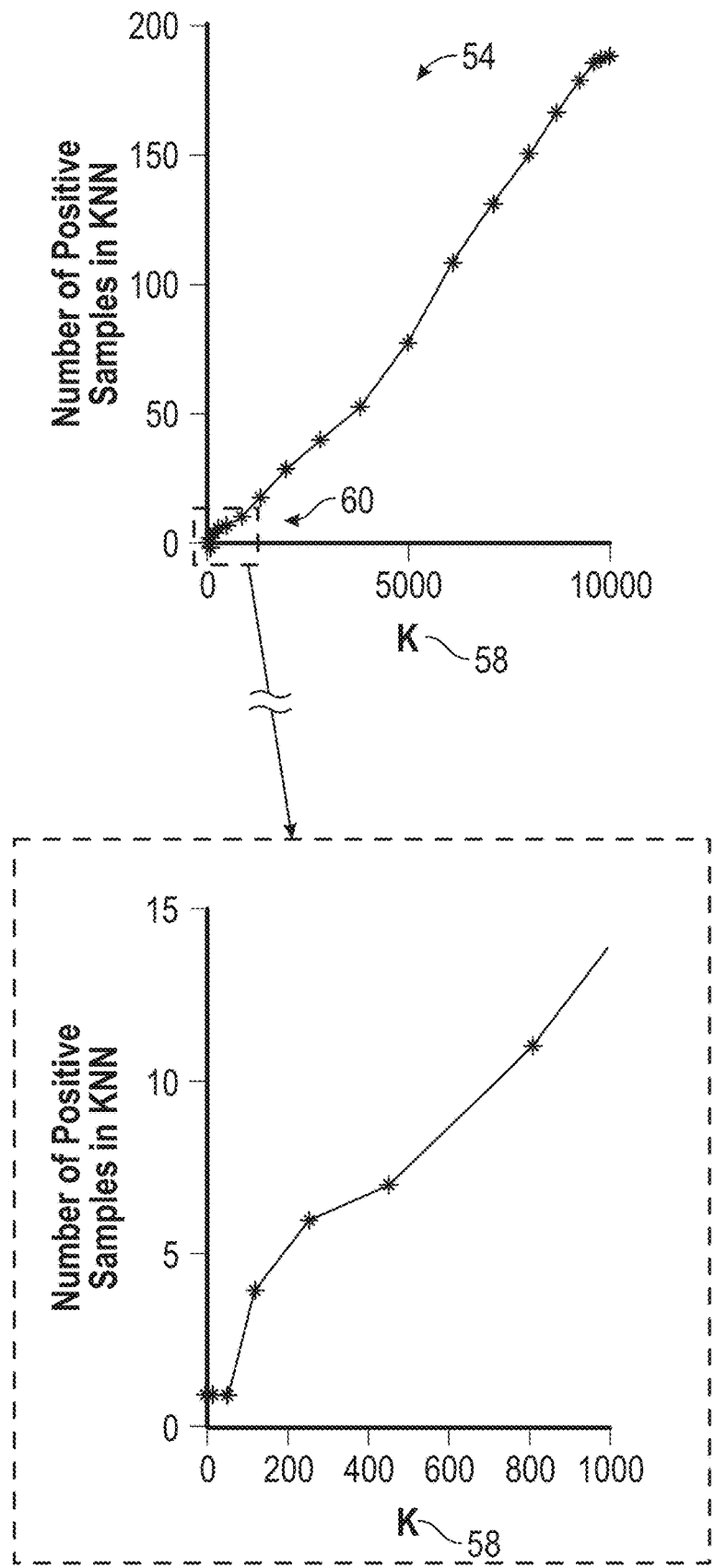
FIG. 11 is a graph illustrating a number of positive samples for various sample neighborhood values.

The neighborhood can be simply defined using K-NN or K nearest neighbors where the same K could mean different distances for different positive samples. FIG. 11 shows one example where we plot the number of all other positive samples of one target positive sample as the K of K-NN is varied from 1 to 9882. The vertical axis represents a number of positive samples in K-NN, which for this example ranges from 0 to 188, since there are only 188 total positive samples in the dataset. The horizontal axis represents the K value 58 which may range from 0 to 9882, since there are a total of 9882 samples in the dataset. The line 54 reflects the number of positive samples in K-NN for a particular K value. A portion of the graph 60 is zoomed in to better determine a K value that will result in obtaining good resolution from the neighboring positive samples.

As shown in FIG. 11, when the K approaches the number of total samples, 9882, the number of positive samples in the KNN neighborhood also approaches 188, which is the number of the total positive samples.

The value of K is picked to make sure the number of positive samples in the neighborhood around the positive sample is at least 3 to 5 on average to allow for obtaining a good resolution from neighboring positive samples. Given the global imbalance ratio of 52, the K is determined to be around 200, which is initially calculated by multiplying 52 by a predetermined number, for example 4 selected from 3 to 5, and later fine-tuned by hyperparameter searching based on MCC performance. In other words, the global imbalance ratio is multiplied by the average number of positive samples desired (the predetermined number) in the neighborhood of positive samples. Thus, in the example above, the number should range from 52×3 to 52×5 or 150~250.

Once K of K-NN neighborhood is determined for all positive samples; a multiplication factor is determined to allow the average replication ratio for all the positive samples to approach the reduced global minority-oversampling ratio (the average replication ratio) of 10 as determined in the example described above.

For example, when K is chosen to be 200, there are 4 other positive samples on average within the K-NN neighborhood of each positive sample. The average replication ratio of 10 is sought, so the multiplication factor is determined by taking the average replication ratio (10) and dividing it by the average number of positive samples for the selected K value (4) which results in a multiplication factor of 2.5.

Once the multiplication factor is calculated, Equation 5 below is used to determine the replication ratio for each positive sample from the minority class of the dataset. The replication ratio of Equation 5 may also be known as the local-adapted oversampling ratio.

$$\text{Ratio of replication} = 1 + F^* N_{KNN} \quad \text{(Equation 5)}$$

Where F is the multiplication factor calculated by taking the average replication ratio and dividing it by a number of positive samples on average within the K-NN neighborhood of each positive sample. For the example above the multiplication factor is 2.5, and $N_{KNN}$ is the number of positive samples in the K-NN neighborhood of each positive sample.

Figure 12:
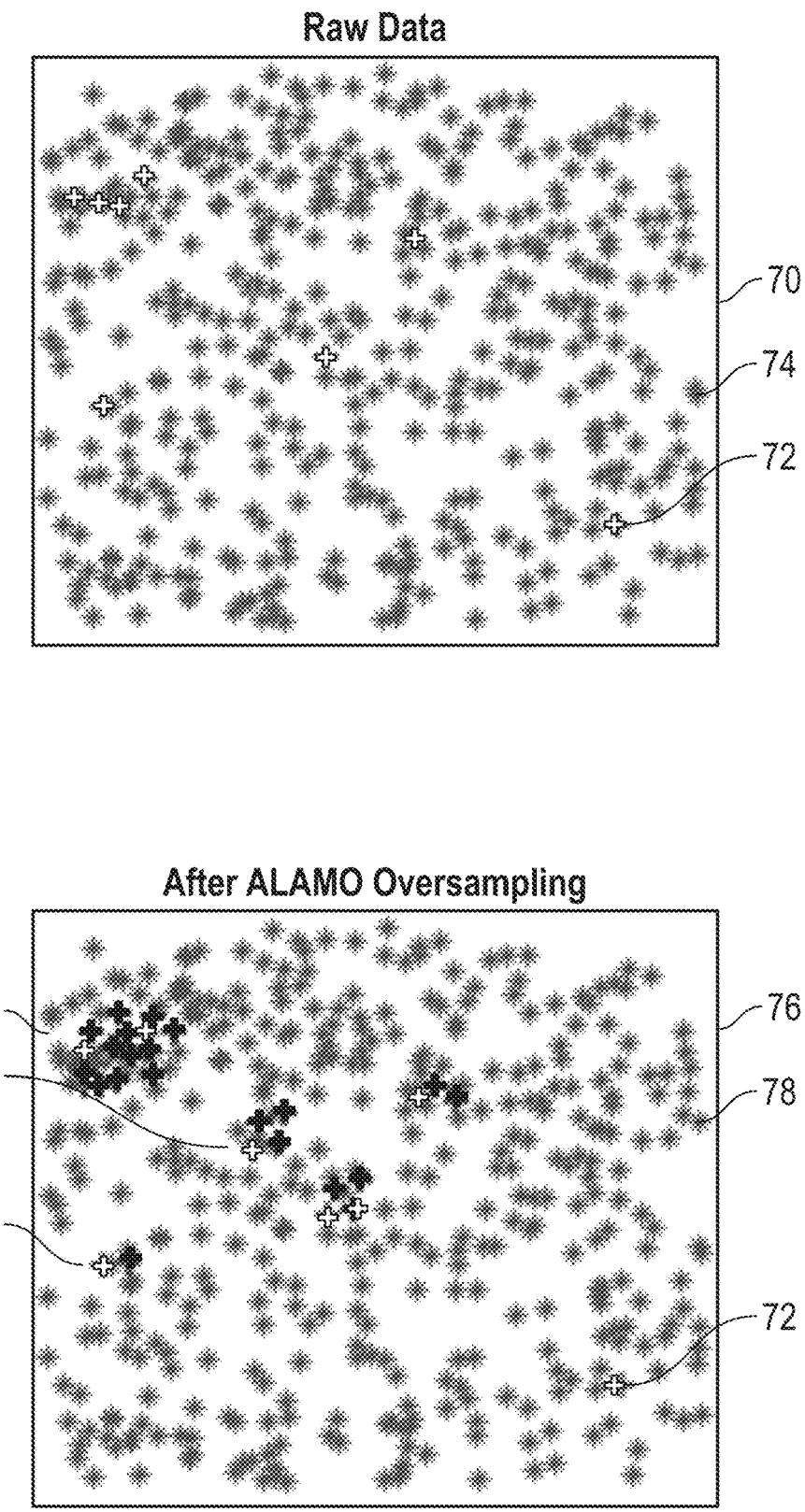
FIG. 12 is a graph illustrating raw data and the new generated data after a local-adapted minority oversampling in accordance with one or more aspects of the present disclosure.

FIG. 12 illustrates a raw dataset 70 prior to a local-adapted minority oversampling technique and an ALAMO dataset 76 after a local-adapted minority oversampling. The raw dataset 70 includes negative samples 74 from the majority class and positive samples 72 from the minority class prior to any oversampling of the positive samples 72 from the minority class. The negative samples being represented by gray stars 74 and the positive samples 72 being represented by white plus marks in the raw dataset 70. The ALAMO dataset 76 includes positive samples 72 that have been oversampled at different replication ratios using Equation 5 described above as set out in the local-adapted minority oversampling technique in accordance with the present disclosure. In the ALAMO dataset 76, there is now bolder plus marks representing the replicated positive samples, which surround some of the white plus marks.

The regions 80, 82 and 84 represent different replication ratios within the ALAMO oversampling dataset 76. However, not all the positive samples are replicated, the positive sample in the bottom right corner of the ALAMO oversampling dataset 76 has not been replicated based on the determination from equation 5 that replicating that particular positive sample would not be helpful. That positive sample in the ALAMO dataset 76 was not replicated because a zero replication ratio was used which means no additional replication for that positive sample in order to reduce the impact of that particular positive sample. The other positive samples in regions 80, 82 and 84 in the ALAMO dataset 76 are replicated at different ratios. The locally-adapted minority oversampling approach results in a more accurate and effective predictive model for a highly imbalanced highly noisy dataset.

To evaluate the effectiveness of the local-adapted minority oversampling approach, the example provided was tested against the sample dataset shown in FIG. 2. This dataset was used to predict whether a PCB-ASSY board of a device needed to be replaced using sensor data, service history, and textual transcriptions based on customer's phone calls before a technician visited.

Without loss of generality, the use of XGBoost as the parametric model for training. XGBoost is an effective technique in model prediction and a common method used in predictive modelling, outperforming most pre-established models, including SVM, random forest, and gradient boost. It is a state-of-the-art technique for classification and regression when using structured or tabular dataset.

TABLE 1

Performance comparison between alternative oversampling methods

|  | MCC | F1 | Recall | Precision |
| --- | --- | --- | --- | --- |
| Fixed global oversampling | 0.21 | 0.20 | 0.43 | 0.13 |
| Reduced global oversampling | 0.33 | 0.33 | 0.28 | 0.41 |
| A Local-adapted oversampling (ALAMO) | 0.37 | 0.37 | 0.29 | 0.48 |

As seen in Table 1, a local-adapted minority oversampling (ALAMO) approach provides the best performance in terms of both MCC, F1 and Precision. Although Recall is sacrificed, the benefit from much more Precision (13% in fixed global oversampling to 48% in ALAMO), is the focus of the ALAMO approach in accordance with the present disclosure.

Figure 13:
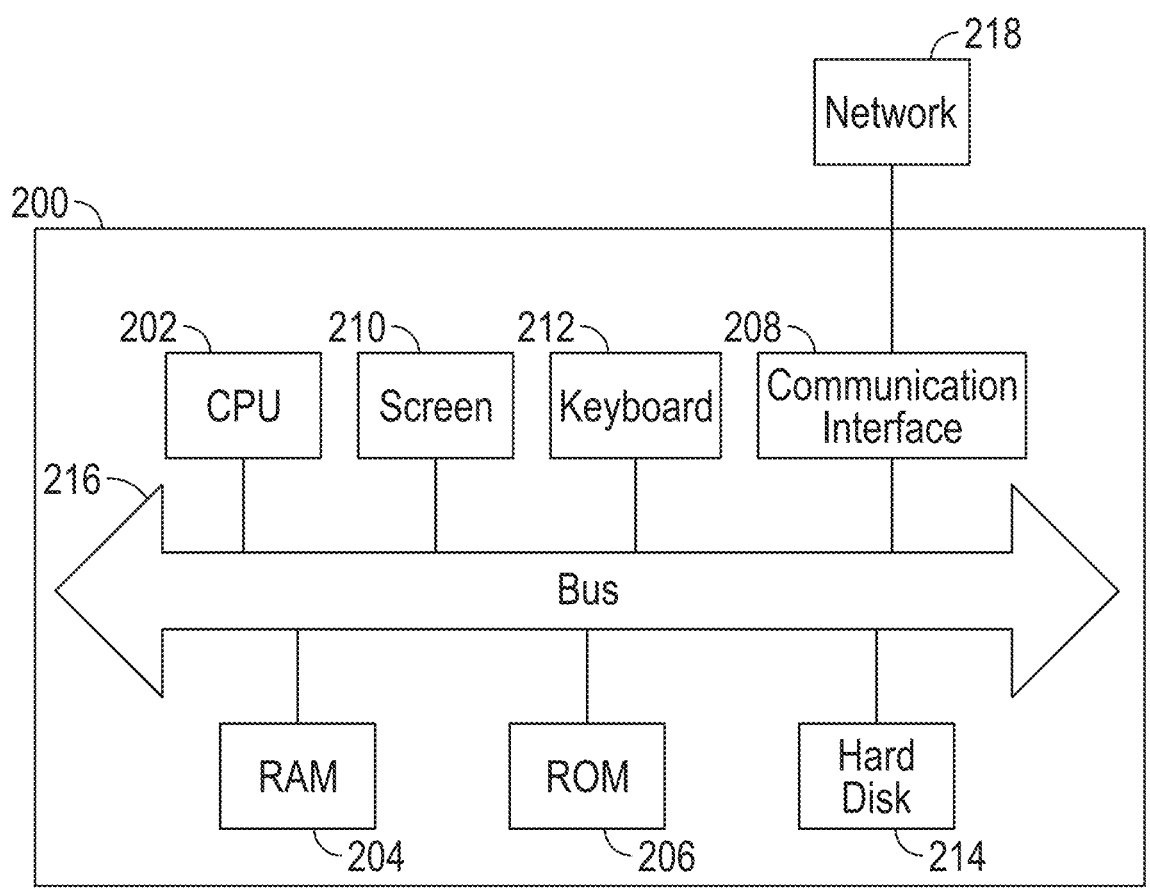
FIG. 13 is an exemplary block diagram illustrating a hardware configuration of a computer used to apply a local adapted minority oversampling technique to a dataset in accordance with one or more aspects of the present disclosure.

FIG. 13 is an exemplary block diagram of a hardware configuration of any computer that may be configured to execute various steps including the steps of FIG. 7 to apply a local-adapted minority oversampling technique to a highly imbalanced highly noisy dataset.

The computer (not shown) includes a central processing unit ("CPU") 202, a ROM 206, a RAM 204, a communication interface 208, a hard disk (and/or other storage device) 214, a display interface 210, an input device (for example, a mouse, keyboard or a touch panel) 212 and a BUS or other connection lines (e.g., connection line 216) between one or more of the aforementioned components as shown in FIG. 13. The computer may include one or more combinations of the other aforementioned components. The CPU 202 is configured to read and perform computer-executable instructions stored in a storage medium. The computer-executable instructions may include those for the performance of the methods and/or calculations described herein. The computer may include one or more additional processors in addition to CPU 202, and such processors, including the CPU 202, may be used for acquiring a dataset such as a highly imbalanced highly noisy dataset in order to apply a local-adapted minority oversampling as a predictive model for the dataset. The computer may further include one or more processors connected via a network connection (e.g., via network 218). The CPU 202 and any additional processor being used by the computer may be located in the same telecom network or in different telecom networks.

The I/O or communication interface 208 provides communication interfaces to input and output devices, which may include a communication cable and a network (either wired or wireless), a keyboard, a mouse, a touch screen or monitor.

Any methods and/or data of the present disclosure, such as the methods for applying a local-adapted minority oversampling, may be stored on a computer-readable storage medium. A computer-readable and/or writable storage medium used commonly, such as, but not limited to, one or more of a hard disk (e.g., the hard disk 214, a magnetic disk, etc.), a flash memory, a CD, an optical disc (e.g., a compact disc ("CD") a digital versatile disc ("DVD"), a Blu-ray™ disc, etc.), a magneto-optical disk, a random-access memory ("RAM") (such as the RAM 204), a DRAM, a read only memory ("ROM"), a storage of distributed computing systems, a memory card, or the like (e.g., other semiconductor memory, such as, but not limited to, a non-volatile memory card, a solid state drive, SRAM, etc.), an optional combination thereof, a server/database, etc. may be used to cause a processor, such as, the processor or CPU 202 of the aforementioned computer to perform the steps of the methods disclosed herein. The computer-readable storage medium may be a non-transitory computer-readable medium, and/or the computer-readable medium may comprise all computer-readable media, with the sole exception being a transitory, propagating signal. The computer-readable storage medium may include media that store information for predetermined or limited or short period(s) of time and/or only in the presence of power, such as, but not limited to Random Access Memory (RAM), register memory, processor cache(s), etc. Embodiment(s) of the present disclosure may also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s).

The above described devices, systems, and methods can be implemented by supplying one or more computer-readable media having stored therein computer-executable instructions for realizing the above described operations to one or more computer devices that are configured to read the computer-executable instructions and execute them. In this case, the system or devices perform the operations of the above-described embodiments when executing the computer-executable instructions. Also, an operating system on the one or more systems or devices may implement the operations of the above described embodiments. Thus, the computer-executable instructions or the one or more computer-readable media storing the computer-executable instructions or the one or more computer-readable media storing the computer-executable instructions thereon constitute an embodiment.

While the above disclosure describes certain illustrative embodiments, the present disclosure is not limited to the above-described embodiments, and the following claims include various modifications and equivalent arrangements within their scope.

What is claimed is:

1. A method of applying a local-adapted minority oversampling to an imbalanced dataset including positive samples belonging to a minority class and negative samples belonging to a majority class, the minority class being less prevalent than the majority class, wherein each sample from the dataset is represented by a plurality of features, the method comprising:
    determining a local imbalance for each positive sample from the minority class corresponding to a number of other positive samples and/or negative samples within a neighborhood of each positive sample;
    calculating a local-adapted oversampling ratio based on the local imbalance estimated for each positive sample; and
    replicating each positive sample using the local-adapted oversampling ratio to generate a new dataset.

2. The method of claim 1, further comprising calculating a distance between each positive sample from the minority class and all other positive samples in the minority class and negative samples from the majority class to obtain a neighborhood value for each positive sample.

3. The method of claim 1, further comprising obtaining a number of other positive samples within a neighborhood for each positive sample based on a distance calculated between a positive sample and the other positive samples and the negative samples.

4. The method of claim 1, wherein a global imbalance ratio is a ratio of positive samples to negative samples in the imbalanced dataset.

5. The method of claim 4, further comprising generating an average replication ratio by multiplying the global imbalance ratio with an oversampling index.

6. The method of claim 5, wherein the oversampling index ranges from 0 to 1, wherein the oversampling index corresponds to the global imbalance ratio when the oversampling index is 1.

7. The method of claim 5, wherein the oversampling index is selected based on a performance metric.

8. The method of claim 7, wherein the performance metric is Matthew's correlation coefficient (MCC).

9. The method of claim 5, further comprising calculating a multiplication factor (F) by dividing the average replication ratio by the number of other positive samples within the neighborhood.

10. The method of claim 9, wherein the local-adapted oversampling ratio=$(1+F*N_{KNN})$, where $N_{KNN}$ is the number of other positive samples within the neighborhood.

11. The method of claim 2, wherein calculating the distance between any two samples from the dataset is a Minkowski distance.

12. The method of claim 1, wherein the neighborhood may range from a value of 1 to a total number of samples in the dataset.

13. The method of claim 4, wherein the global imbalance ratio is 1:50 or greater.

14. The method of claim 1, wherein the plurality of features include a total quantity greater than a total quantity of positive samples in the minority class.

15. The method of claim 1, wherein the plurality of features define the samples in the dataset.

16. The method of claim 5, further comprising normalizing each feature in the dataset prior to generating the average replication ratio.

17. The method of claim 16, wherein at least one invalid feature is removed from the dataset prior to normalizing each feature.

18. The method of claim 1, further comprising determining the local-adapted oversampling ratio based on the local imbalance for each positive sample from the minority class corresponding to the number of other positive samples within the neighborhood of each positive sample and a global imbalance ratio.

19. An apparatus for applying a local-adapted minority oversampling strategy to an imbalanced dataset including positive samples belonging to a minority class and negative samples belonging to a majority class, the minority class being less prevalent than the majority class, wherein each sample from the dataset is represented by a plurality of features, the apparatus comprising:
    a memory for storing data;
    a processor in communication with the memory for executing the following steps:
        determining a local imbalance for each positive sample from the minority class corresponding to a number of other positive samples and/or negative samples within a neighborhood of each positive sample;

calculating a local-adapted oversampling ratio based on the local imbalance estimated for each positive sample; and replicating each positive sample using the local-adapted oversampling ratio to generate a new dataset.

20. A non-transitory computer-readable storage medium storing a computer-readable program for causing a computer to execute a method of applying a local-adapted minority oversampling to an imbalanced dataset including positive samples belonging to a minority class and negative samples belonging to a majority class, the minority class being less prevalent than the majority class, wherein each sample from the dataset is represented by a plurality of features, the method comprising:

determining a local imbalance ratio for each positive sample from the minority class corresponding to a number of other positive samples and/or negative samples within a neighborhood of each positive sample;

calculating a local-adapted oversampling ratio based on the local imbalance estimated for each positive sample; and replicating each positive sample using the local-adapted oversampling ratio to generate a new dataset.

* * * * *